United States Patent
Ray et al.

(10) Patent No.: US 8,626,112 B2
(45) Date of Patent: Jan. 7, 2014

(54) MULTI-BUTTON EMERGENCY MESSAGE GENERATION

(75) Inventors: Amar Nath Ray, Shawnee, KS (US); Carl M. Coppage, Kansas City, KS (US); Lynne T. Greene, Olathe, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 397 days.

(21) Appl. No.: 12/257,640

(22) Filed: Oct. 24, 2008

(65) Prior Publication Data
US 2010/0003948 A1    Jan. 7, 2010

Related U.S. Application Data

(60) Provisional application No. 61/078,123, filed on Jul. 3, 2008.

(51) Int. Cl.
*H04M 11/04* (2006.01)
*H04B 7/00* (2006.01)
*H04W 24/00* (2009.01)

(52) U.S. Cl.
USPC .................. 455/404.1; 455/521; 455/456.1

(58) Field of Classification Search
USPC ....................................................... 455/404.1
See application file for complete search history.

(56) References Cited

U.S. PATENT DOCUMENTS

| | | |
|---|---|---|
| 5,339,351 A | 8/1994 | Hoskinson et al. |
| 5,379,337 A | 1/1995 | Castillo et al. |
| 5,497,149 A | 3/1996 | Fast |
| 5,555,286 A | 9/1996 | Tendler |
| 5,646,987 A | 7/1997 | Gerber et al. |
| 5,710,803 A | 1/1998 | Kowal et al. |
| 5,936,622 A | 8/1999 | Halverson et al. |
| 5,941,930 A | 8/1999 | Morimoto et al. |
| 6,240,285 B1 | 5/2001 | Blum et al. |
| 6,317,049 B1 * | 11/2001 | Toubia et al. .............. 340/573.4 |
| 6,366,772 B1 | 4/2002 | Arnson |
| 6,377,169 B1 | 4/2002 | Yanagisawa |
| 6,405,033 B1 | 6/2002 | Kennedy et al. |
| 6,415,018 B1 | 7/2002 | Antonucci et al. |
| 6,424,908 B2 | 7/2002 | Urban et al. |
| 6,456,695 B2 | 9/2002 | Lee |
| 6,480,578 B1 | 11/2002 | Allport |
| 6,526,125 B1 | 2/2003 | Lindsay et al. |
| 6,631,184 B1 | 10/2003 | Weiner |
| 6,636,732 B1 * | 10/2003 | Boling et al. .............. 455/404.1 |

(Continued)

OTHER PUBLICATIONS

Dale N. Hatfield, "A Report on Technical and Operational Issues Impacting the Provision of Wireless Enhanced 911 Services," Federal Communications Commission, printed from the World Wide Web on May 8, 2006 (54 pages).

(Continued)

*Primary Examiner* — Olumide T Ajibade Akonai
*Assistant Examiner* — Andy Gu
(74) *Attorney, Agent, or Firm* — Swanson & Bratschun, L.L.C.

(57) ABSTRACT

A wireless communications device and method for generating and communicating an emergency text message includes, in response to receiving a request initiated from one of a plurality of emergency message buttons configured to initiate communication of respective emergency messages related to different emergency categories, generating an emergency message related to the respective emergency category. The generated emergency message may be then be communicated over a communications network.

19 Claims, 9 Drawing Sheets

(56) References Cited

U.S. PATENT DOCUMENTS

| | | |
|---|---|---|
| 6,690,932 B1 | 2/2004 | Barnier et al. |
| 7,026,925 B2 | 4/2006 | Roche et al. |
| 7,079,627 B2 | 7/2006 | Crago et al. |
| 7,095,733 B1 | 8/2006 | Yarlgadda et al. |
| 7,231,218 B2 | 6/2007 | Diacakis et al. |
| 7,269,413 B2 | 9/2007 | Kraft |
| 7,391,784 B1 | 6/2008 | Renkel |
| 7,418,087 B2 | 8/2008 | Luneau et al. |
| 7,444,238 B1 | 10/2008 | Opitz |
| 7,496,189 B2 | 2/2009 | Clarisse et al. |
| 7,679,505 B1 | 3/2010 | Vallaire |
| 7,706,356 B1 | 4/2010 | Olshansky et al. |
| 7,734,019 B1 | 6/2010 | Terpstra |
| 7,751,534 B2 | 7/2010 | Sun |
| 8,364,117 B2 | 1/2013 | Hawkins |
| 8,428,548 B2 | 4/2013 | Ray et al. |
| 8,472,916 B2 | 6/2013 | Coppage et al. |
| 8,489,062 B2 | 7/2013 | Ray et al. |
| 8,521,121 B2 | 8/2013 | Ray et al. |
| 8,538,370 B2 | 9/2013 | Ray et al. |
| 8,548,421 B2 | 10/2013 | Ray et al. |
| 2001/0003843 A1 | 6/2001 | Scepanovic et al. |
| 2001/0004588 A1 | 6/2001 | Hong |
| 2001/0012379 A1 | 8/2001 | Amemiya et al. |
| 2002/0016189 A1 | 2/2002 | Sheynblat et al. |
| 2002/0068584 A1 | 6/2002 | Gage et al. |
| 2002/0136363 A1 | 9/2002 | Stumer et al. |
| 2003/0063714 A1 | 4/2003 | Stumer et al. |
| 2003/0109245 A1 | 6/2003 | McCalmont et al. |
| 2003/0122779 A1 | 7/2003 | Martin et al. |
| 2003/0133450 A1 | 7/2003 | Baum |
| 2003/0162554 A1 | 8/2003 | Kim |
| 2004/0029610 A1 | 2/2004 | Ihira et al. |
| 2004/0056770 A1 | 3/2004 | Metcalf |
| 2004/0063439 A1 | 4/2004 | Glazko et al. |
| 2004/0072583 A1* | 4/2004 | Weng ..................... 455/456.3 |
| 2004/0113836 A1 | 6/2004 | Rickerson, Jr. |
| 2004/0157564 A1 | 8/2004 | Murakami et al. |
| 2004/0176123 A1 | 9/2004 | Chin et al. |
| 2004/0185871 A1 | 9/2004 | Somani et al. |
| 2004/0198329 A1* | 10/2004 | Vasa ..................... 455/414.1 |
| 2004/0258216 A1* | 12/2004 | Reid ..................... 379/88.13 |
| 2005/0003797 A1 | 1/2005 | Baldwin |
| 2005/0048947 A1 | 3/2005 | Holland et al. |
| 2005/0070315 A1 | 3/2005 | Rai et al. |
| 2005/0085257 A1 | 4/2005 | Laird et al. |
| 2005/0090225 A1 | 4/2005 | Muehleisen et al. |
| 2005/0097380 A1 | 5/2005 | Kim |
| 2005/0101287 A1 | 5/2005 | Jin et al. |
| 2005/0111630 A1 | 5/2005 | Potorny et al. |
| 2005/0169248 A1 | 8/2005 | Truesdale et al. |
| 2005/0197096 A1 | 9/2005 | Yang et al. |
| 2005/0201358 A1 | 9/2005 | Nelson et al. |
| 2005/0209781 A1 | 9/2005 | Anderson |
| 2005/0239477 A1 | 10/2005 | Kim et al. |
| 2005/0265326 A1 | 12/2005 | Laliberte |
| 2005/0277405 A1 | 12/2005 | Noguchi |
| 2006/0009243 A1 | 1/2006 | Dahan et al. |
| 2006/0052134 A1 | 3/2006 | Sato |
| 2006/0056620 A1 | 3/2006 | Shingal et al. |
| 2006/0133582 A1 | 6/2006 | McCulloch |
| 2006/0145841 A1 | 7/2006 | Daurensan et al. |
| 2006/0152373 A1 | 7/2006 | King |
| 2006/0166685 A1 | 7/2006 | Adkins |
| 2006/0217105 A1* | 9/2006 | Kumar P S et al. ........ 455/404.1 |
| 2006/0217136 A1 | 9/2006 | Bantukul et al. |
| 2006/0219542 A1 | 10/2006 | Savir |
| 2006/0222151 A1 | 10/2006 | Goldman et al. |
| 2006/0227122 A1 | 10/2006 | Proctor |
| 2006/0229100 A1 | 10/2006 | Born |
| 2006/0238384 A1 | 10/2006 | Hess et al. |
| 2006/0276168 A1 | 12/2006 | Fuller et al. |
| 2006/0293024 A1 | 12/2006 | Benco et al. |
| 2007/0001902 A1 | 1/2007 | Kuo et al. |
| 2007/0003024 A1 | 1/2007 | Olivier et al. |
| 2007/0082652 A1 | 4/2007 | Hartigan et al. |
| 2007/0201391 A1 | 8/2007 | Belmonte et al. |
| 2007/0201645 A1 | 8/2007 | Gass et al. |
| 2007/0273519 A1 | 11/2007 | Ichikawa et al. |
| 2007/0280428 A1 | 12/2007 | McClelland |
| 2007/0287473 A1 | 12/2007 | Dupray |
| 2008/0001734 A1 | 1/2008 | Stilp et al. |
| 2008/0013696 A1 | 1/2008 | Motley et al. |
| 2008/0057944 A1 | 3/2008 | Miriyala et al. |
| 2008/0057987 A1 | 3/2008 | Landschaft et al. |
| 2008/0064363 A1 | 3/2008 | Salafia et al. |
| 2008/0070553 A1 | 3/2008 | Yamakawa et al. |
| 2008/0122929 A1 | 5/2008 | Chukwu |
| 2008/0220715 A1 | 9/2008 | Sinha et al. |
| 2008/0227427 A1 | 9/2008 | Kadavallur et al. |
| 2008/0254810 A1 | 10/2008 | Fok et al. |
| 2008/0273670 A1 | 11/2008 | Dickinson |
| 2008/0275950 A1 | 11/2008 | Jordan |
| 2008/0287748 A1 | 11/2008 | Sapounas et al. |
| 2008/0310850 A1 | 12/2008 | Pederson et al. |
| 2009/0047924 A1 | 2/2009 | Ray et al. |
| 2009/0064039 A1 | 3/2009 | Lee et al. |
| 2009/0121930 A1 | 5/2009 | Bennett et al. |
| 2009/0131072 A1 | 5/2009 | Razdan et al. |
| 2009/0144157 A1 | 6/2009 | Saracino et al. |
| 2009/0149153 A1 | 6/2009 | Lee |
| 2009/0186596 A1 | 7/2009 | Kaltsukis |
| 2009/0197567 A1* | 8/2009 | Ogram ..................... 455/404.2 |
| 2009/0215428 A1 | 8/2009 | Noldus et al. |
| 2009/0227225 A1 | 9/2009 | Mitchell et al. |
| 2009/0233573 A1 | 9/2009 | Gray |
| 2009/0310602 A1* | 12/2009 | Olshansky et al. ........... 370/352 |
| 2010/0098062 A1 | 4/2010 | Croak et al. |
| 2010/0291894 A1 | 11/2010 | Pipes |
| 2013/0115909 A1 | 5/2013 | Hawkins |
| 2013/0301505 A1 | 11/2013 | Ray et al. |

OTHER PUBLICATIONS

Ansi, "TIA Standard Telecommunications Telephone Terminal Equipment Caller Identity and Visual Message Waiting Indicator Equipment Performance Requirements," TIA-777-A, Revision of TIA/EIA-777, May 1, 2003 (77 pages).

Micro Engineering Labs, Inc., "Caller ID", Retrieved from the Internet at URL: <http://www.melabs.com/resources/callerid.htm> on Apr. 24, 2006; Copyright 2006 by microEngineering Labs, Inc (as of date of retrieval, article last updated Apr. 16, 2006) (3 pages).

Dave Ryan & Asher Hazanchuk, "On-Hook & Off-Hook Caller ID Using DSP," Circuit Cellular Ink # 83, Jun. 1997 (12 pages).

Ittiam Systems, "Caller Identification (CLI or Caller ID)," Retrieved from the Internet on Apr. 24, 2006 at URL <http://www.ittiam.com/pages/products/cid.htm, downloaded from the World Wide Web on Apr. 24, 2006 (2 pages).

"AT & T Wireless Unleashes the First and Only Wireless Messaging Device", PhysOrg.com, Sep. 30, 2004; available online at URL: <http://www.physorg.com/news1392.html> (12 pages).

Non-Final Office Action date mailed Aug. 3, 2010 for U.S. Appl. No. 11/891,784.

Response filed Nov. 2, 2010 for U.S. Appl. No. 11/891,784.

Non-Final Rejection mailed Jan. 19, 2011 for U.S. Appl. No. 11/430,232.

Non-Final Rejection mailed Mar. 17, 2011 for U.S. Appl. No. 11/640,714.

RCE filed on Apr. 4, 2011 for U.S. Appl. No. 11/891,784.

Final Rejection mailed Jan. 3, 2011 for U.S. Appl. No. 11/891,784.

Non-Final Rejection mailed Mar. 4, 2011 for U.S. Appl. No. 12/257,424.

"NENA Recommended Generic Standards for E9-1-1 PSAP Equipment" NENA Technical Reference. NENA-04-001 Issue 2, Mar. 2001.

Non-Final Rejection mailed Mar. 28, 2011 for U.S. Appl. No. 12/272,238.

Non-Final Rejection mailed Apr. 1, 2011 for U.S. Appl. No. 12/257,655.

Non-Final Rejection mailed Mar. 3, 2011 for U.S. Appl. No. 12/257,416.

(56) References Cited

OTHER PUBLICATIONS

U.S. Appl. No. 12/070,775; Notice of Allowance dated Sep. 12, 2012; 24 pages.
U.S. Appl. No. 12/257,674; Final Rejection dated Nov. 5, 2012; 17 pages.
U.S. Appl. No. 12/257,687; Final Rejection dated Aug. 31, 2012; 19 pages.
U.S. Appl. No. 12/257,717; Non-Final Rejection dated Aug. 16, 2012; 42 pages.
U.S. Appl. No. 12/257,836; Non-Final Rejection dated Sep. 12, 2012; 25 pages.
U.S. Appl. No. 12/257,674; Notice of Allowance dated Jan. 25, 2012; 7 pages.
U.S. Appl. No. 12/257,674; Final Rejection dated Oct. 3, 2011; 15 pages.
U.S. Appl. No. 12/257,674 Non-Final Rejection dated Apr. 28, 2011; 14 pages.
U.S. Appl. No. 12/257,717; Final Rejection dated Jan. 23, 2012; 16 pages.
U.S. Appl. No. 12/257,717; Non-Final Rejection dated Sep. 13, 2011; 14 pages.
U.S. Appl. No. 12/257,736; Non-Final Rejection dated Apr. 28, 2011; 15 pages.
U.S. Appl. No. 12/257,736; Final Rejection dated Nov. 23, 2011; 17 pages.
U.S. Appl. No. 12/257,736; Amendment and Request for Continued Examination dated Feb. 22, 2012; 12 pages.
U.S. Appl. No. 12/257,725; Final Rejection dated Jan. 17, 2012; 17 pages.
U.S. Appl. No. 12/257,725; Non-Final Rejection dated Jul. 19, 2011; 26 pages.
U.S. Appl. No. 12/257,655; Final Rejection dated Sep. 16, 2011; 20 pages.
U.S. Appl. No. 12/257,655; Amendment and Request for Continued Examination dated Dec. 16, 2011; 14 pages.
U.S. Appl. No. 12/257,836 Non-Final Rejection dated Nov. 29, 2011; 13 pages.
U.S. Appl. No. 12/257,836; Non-Final Rejection dated Jun. 8, 2011; 15 pages.
U.S. Appl. No. 12/257,687; Non-Final Rejection dated Apr. 9, 2012; 16 pages.
U.S. Appl. No. 12/257,687; Non-Final Rejection dated May 10, 2011; 14 pages.
U.S. Appl. No. 12/257,687; Final Rejection dated Sep. 29, 2011; 12 pages.
U.S. Appl. No. 12/257,416; Final Rejection dated Jul. 14, 2011; 17 pages.
U.S. Appl. No. 12/070,775; Non-Final Rejection dated Jul. 25, 2011; 33 pages.
U.S. Appl. No. 12/070,775; Final Rejection dated May 14, 2012; 27 pages.
U.S. Appl. No. 12/257,416; Final Rejection dated Jun. 13, 2012; 38 pages.
U.S. Appl. No. 12/257,655; Non-Final Rejection dated Jul. 17, 2012; 26 pages.
U.S. Appl. No. 12/257,674; Non-Final Rejection dated Jul. 20, 2012; 21 pages.
U.S. Appl. No. 12/257,836; Final Rejection dated May 14, 2012; 26 pages.
U.S. Appl. No. 12/070,775; Issue Notification dated Jan. 9, 2013; 1 page.
U.S. Appl. No. 12/257,655; Final Rejection dated Jan. 2, 2013; 18 pages.
U.S. Appl. No. 12/257,687; Notice of Allowance dated Feb. 20, 2013; 20 pages.
U.S. Appl. No. 12/257,687; Notice of Panel Decision on Pre-Appeal Brief Review dated Dec. 14, 2012; 2 pages.
U.S. Appl. No. 12/257,717; Notice of Allowance dated Feb. 14, 2013: 35 pages.
U.S. Appl. No. 12/257,725; Notice of Allowance dated Dec. 24, 2012; 24 pages.
U.S. Appl. No. 12/257,836; Notice of Allowance dated Mar. 12, 2013; 31 pages.
U.S. Appl. No. 12/257,416; Non Final Office Action dated May 22, 2013; 40 pages.
U.S. Appl. No. 12/257,655; Notice of Allowance dated Apr. 16, 2013; 15 pages.
U.S. Appl. No. 12/257,674; Notice of Allowance dated Apr. 3, 2013; 15 pages.
U.S. Appl. No. 12/257,687; Issue Notification dated Jun. 5, 2013; 1 page.
U.S. Appl. No. 12/257,725; Issue Notification dated Apr. 3, 2013; 1 page.
U.S. Appl. No. 12/257,836; Issue Notification dated Jun. 26, 2013; 1 page.
U.S. Appl. No. 13/712,669; Non-Final Rejection dated Mar. 27, 2013; 34 pages.
U.S. Appl. No. 12/257,736; Notice of Allowance dated Aug. 1, 2013; 35 pages.
U.S. Appl. No. 12/257,717; Issue Notification dated Aug. 7, 2013; 1 page.
U.S. Appl. No. 12/257,674; Issue Notification dated Aug. 28, 2013; 2 pages.
U.S. Appl. No. 12/257,655; Issue Notification dated Sep. 11, 2013; 1 page.
U.S. Appl. No. 12/257,416; Final Rejection dated Sep. 17, 2013; 41 pages.
U.S. Appl. No. 13/712,669; Final Rejection dated Oct. 18, 2013; 22 pages.

* cited by examiner

MULTI-BUTTON EMERGENCY MESSAGE GENERATION

PRIORITY

This Application claims priority to Provisional Patent Application Ser. No. 61/078,123, entitled: Emergency 911 Text Messaging Services, was filed on Jul. 3, 2008; the entire teachings of which are incorporated herein by reference.

BACKGROUND OF THE INVENTION

When emergencies occur or other assistance is needed, people will reach out to emergency services, such as 911, for help. More frequently, communication to 911 is being made from mobile wireless devices, rather than land based telephone lines. Because different sources for requesting emergency services may have different capabilities (e.g., text messaging), there is a need for emergency call centers to be able to move beyond ordinary PSTN telephone capabilities. For example, text messaging, e-mail, and various other features have become more common on mobile wireless devices.

BRIEF SUMMARY OF THE INVENTION

In order to provide an emergency call center, such as a 911 Public Safety Answering Point (PSAP), with complete information in the event a message or other similar emergency communication is sent to the PSAP, a preformatted emergency text message may be generated on a wireless communications device and communicated via a communications network. Multiple buttons may be provided on the wireless communications device to allow for a user to select an emergency category and generate a unique message based on the emergency category. An appropriate emergency call center may be determined on the communications network and the generated preformatted emergency text message may be communicated to the appropriate PSAP.

One embodiment of a method for generating an emergency message includes, in response to receiving a request initiated from one of a plurality of emergency message buttons configured to initiate communication of respective emergency messages related to different emergency categories, generating an emergency message related to the respective emergency category. The generated emergency message may be then be communicated over a communications network.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE INVENTION

Figure 1:
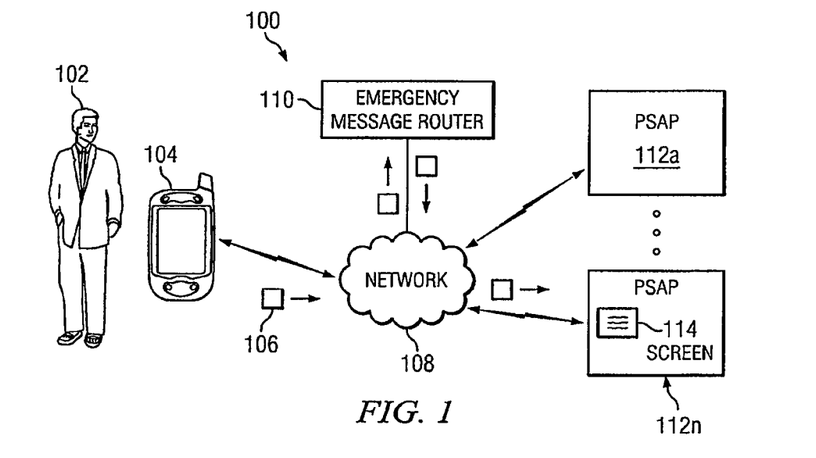
FIG. 1 is an illustration of one embodiment of an environment for generating and communicating a preformatted emergency text message.

FIG. 1 is an illustration of one embodiment of an environment 100 for generating and communicating a preformatted or un-preformatted emergency text message. A user 102 using a wireless communications device 104 may communicate an emergency text message 106 over a communications network 108 via an emergency message router 110 to one of multiple public safety answering point (PSAP) 112a-112n (collectively 112). The wireless communications device 104 may be a cellular phone, text messenger, personal digital assistant (PDA), wireless game device, or any other communications device configured to communicate an emergency text message 106 or other data messages over the communications network 108. An emergency text message 106 may be a short message service (SMS), a multi-media messaging service (MMS), an email, or any other type of text message in which the communications network 108 is configured to communicate. It should be understood that the wireless communications device 104 may similarly be configured to communicate other data messages, such as emails, photographs, videos, instant messages, and the like. The communications network 108 may be a cellular network, such as GSM or CDMA, the Internet, WiMAX, or any other communications network configured to communicate with the PSAP 112. The PSAPs 112 may interact with the communications network 108 to retrieve additional information to help facilitate emergency services.

As not all wireless communications devices are configured to generate preformatted emergency data messages, a user may generate and communicate a freeform emergency data message (e.g., text message, email, instant message, image message) to a network address, such as Internet domain name "911.911," for routing to a PSAP local to the user. A freeform emergency data message is any data message that is addressed and communicated to a network address for routing to a PSAP local to the user.

In one embodiment, the wireless communications device 104 communicates the emergency text message 106 over the wireless communications network 108 to emergency message router 110. The emergency message router 110 may be in communication with the communications network 108 and be configured to receive and distribute emergency text messages, such as emergency text message 106. Some data that the emergency message router 110 may use to route emergency text messages to the appropriate PSAP includes current user location information, such as a cell site ID code (CCID), also referred to as cell site coordinates, global positioning system (GPS) coordinates, or other available information in the emergency text message 106. Along with information stored in the emergency message router 110, as well as available on remote sources, the emergency message router 110 may then choose the most appropriate PSAP for message delivery. Given that there are many thousands of PSAPs, selection of the most appropriate or closest PSAP to the current location of the user who sent the emergency text message can be helpful to emergency personnel.

The PSAPs have a wide variety of capabilities depending upon the equipment and level of sophistication of the PSAP 112. For instance, some of the PSAPs 112 may have limited capabilities and be capable of receiving address information, call back number, and a person's name to which the calling phone number is registered. Other, more sophisticated PSAPs 112, may have the ability to receive GPS location coordinates, as well as other more detailed information. The emergency message router 110 may have knowledge of the capabilities of each of the PSAPs 112 and use this knowledge, in addition to distance or other location information, to determine the most appropriate PSAP for the message. Having an emergency message router 110 allows for a stored emergency network address, such as "911.911", to be used as a generic address, rather than individual users 102 having to input a specific PSAP address each time their location changes. Without the emergency message router 110, an emergency text message 106 may be delivered to a PSAP which either does not have the capability of receiving text messages or may not be the closest PSAP to the user 102. Within the PSAP may be one or more terminals having a PSAP display screen 114 for displaying the emergency text message 106. Any known or related information to the user who sent the emergency text message 106 may also be displayed on the PSAP display screen 114 upon receipt.

Figure 2:
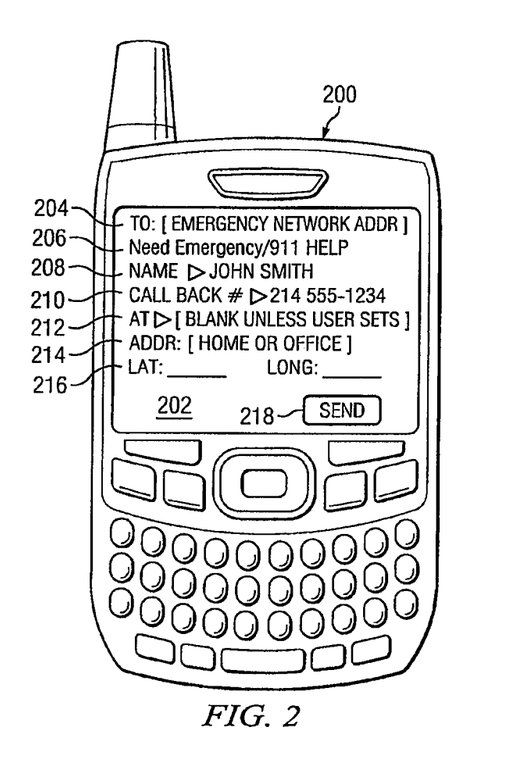
FIG. 2 is an illustration of one embodiment of a wireless communications device configured to communicate a preformatted emergency text message.

FIG. 2 is an illustration of one embodiment of a wireless communications device 200 configured to communicate an emergency text message. The wireless communications device 200 may include a display screen 202 for communicating visual data, such as text, to a user. In this embodiment, the display screen 202 depicts a number of fields used in populating a preformatted emergency text message. A recipient field 204 may include a generic emergency message router address, such as "911.911", as described previously in FIG. 1. By default, the recipient field 204 may automatically be populated with the generic emergency message router address.

A message text field 206 may also be pre-populated with a default message, such as, "need emergency/911 help." In an alternative embodiment, the message text field may be entered manually and edited by the user. Alternatively, the message text field may be selected from a list of pre-defined emergency messages. A name field 208 may also be included for indicating the name of the person associated with a wireless communications device 200 that is communicating the emergency text message. In an alternative embodiment, the name field 208 may also be edited by the user replacing any default name in the field. A call back number field 210 may provide a PSAP with a number for contacting the user for more information regarding an emergency. The call back number 210 may not necessarily be a number directly associated with the wireless communication device 200, but rather may be a number associated with an emergency contact, such as a family member or friend. For example, some wireless communications devices 200 may have text capability, but not voice capability. Therefore, an attempt to call the wireless communication device may not work. Providing the call back number 210 belonging to a friend or family member may allow a person at the PSAP to obtain additional information that could prove helpful.

A current location field 212 may be populated by the user prior to communicating the emergency text message. Alternatively, the current location field 212 may be blank if the user chooses or does not have time to populate the current location field 212. While the current location field 212 may be useful in providing the PSAP with location information, it may not always be possible to have the current location field 212 updated or entered prior to sending the emergency text message. Because the current location field 212 may be blank, a permanent address field 214 may also be provided to send the PSAP. The permanent address may be the user's home or office, where additional information may likely be found. Even if the wireless communications device 200 is not located at the permanent address found in the permanent address field 212, having a permanent contact address may prove to be useful in the event an investigation or other information needs to be obtained at a later time.

GPS coordinate fields 216 may also be included to provide GPS coordinates to the PSAP if the wireless communications device 200 is GPS enabled. If the wireless communications device 200 is GPS enabled, latitude and longitude coordinates may be included in the emergency text message and communicated within the emergency text message to provide specific location information for locating the user with the wireless communications device 200. Frequently, GPS coordinate information will not be available because of location or environmental factors, such as being in a basement or a thickly walled building. Therefore, GPS coordinate information may not be available, even if the wireless communications device 200 is GPS enabled. Additionally, GPS coordinates may be requested from the communications network, as is described below in reference to FIG. 8. When the fields are populated, either by the user or automatically by the wireless communications device 200, a send button 218 may be activated to communicate the emergency text message. The fields may be pre-populated during a setup procedure, with the exception of GPS coordinate field 216, thereby allowing a user in an emergency situation to communicate the message without taking the time to input new information. Because the GPS coordinates are expected to vary over time, the GPS coordinates, if available, may be automatically inserted by the wireless communications device 200 at the time of the emergency.

Figure 3:
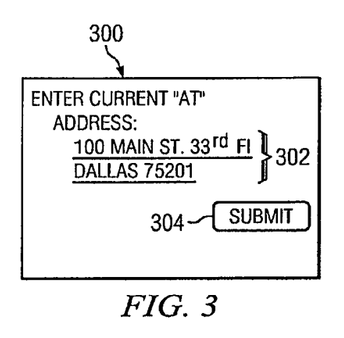
FIG. 3 is a screen shot of one embodiment of a display screen on a wireless communications device.

FIG. 3 is a screen shot of one embodiment of a display screen 300 on a wireless communications device. On the display screen 300, a user may be prompted to enter information into the current location field as described in FIG. 2. The current address input field 302 may be populated using a touch screen or keypad as available on the wireless communications device. The current address input field 302 may be altered at any time by the user. The current address of the user provides the PSAP with more specific information regarding the exact location of the wireless communications device. Upon completion of the address into the current address input field 302, a user may submit the information by selecting the submit button 304. In one embodiment, in order to avoid an incorrect current address or location information from being sent to the PSAP, the wireless communications device may be configured to clear the current location field when it is determined that the user has moved beyond a set distance, such as 50 feet. For example, if a user's CCID code or GPS coordinates have changed, the user would not want the current address field to incorrectly display location information in the event of an emergency. The wireless communications device may be configured to recognize the change and automatically clear out the current location field. In one embodiment, previous addresses may be stored and selectable by the user to make entering the address faster and easier.

Figure 4:
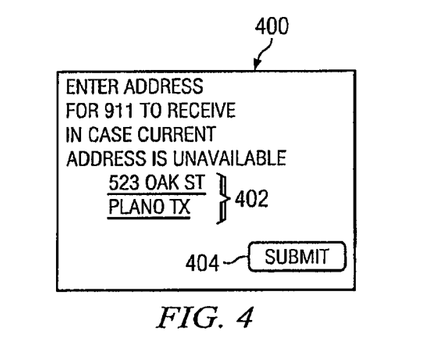
FIG. 4 is a screen shot of one embodiment of a display screen on a wireless communications device.

FIG. 4 is a screen shot of an embodiment of a display screen 400 on a wireless communications device. On the display screen 400, a user may be prompted to enter an address for the permanent address input field 402. The permanent address input field 402 may be the default address for use in the event that a current address is unavailable at the time an emergency text message is being sent by the user. The permanent address input field 402 may be associated with an emergency contact or may be the billing address associated with the wireless communications device. While the permanent address input field 402 may be updated at any time, generally, the permanent address field does not change as frequently as the current address field. In addition to user input, the permanent address input field may be populated based on billing data available over the network or another available data source. Upon population of the permanent address input field, the user may submit the information by selecting a submit button 404.

Figure 5:
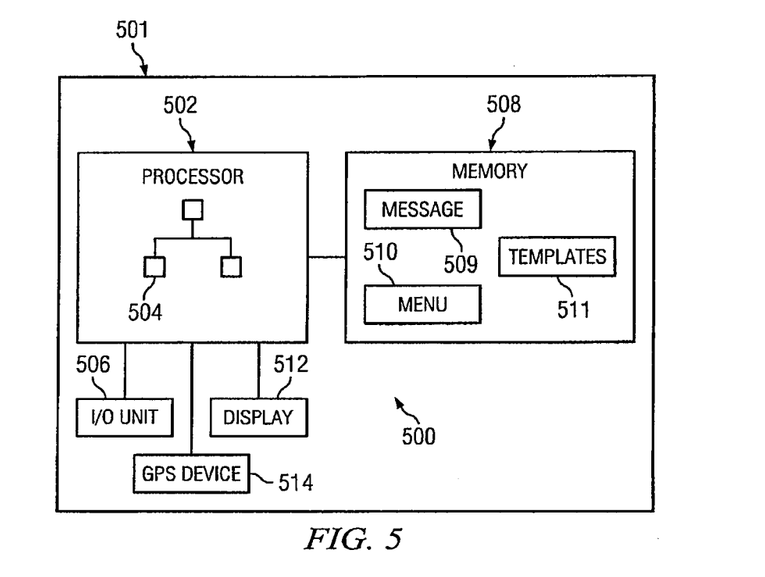
FIG. 5 is an illustration of one embodiment of components of a wireless communications device configured to communicate a preformatted emergency text message according to principles of the present invention.

FIG. 5 is an illustration of one embodiment of components 500 of a wireless communications device 501 configured to communicate a preformatted emergency text message according to principles of the present invention. The wireless communications device 501 may also include a processor 502 for processing the preformatted emergency text message. The processor 502 may execute software 504 capable of performing the functionality of the wireless communications device 501. The wireless communications device 501 may also include an input/output (I/O) unit 506 for communicating emergency text messages as well as providing for the traditional functionalities of the wireless communication device 501, as commonly known in the art. The I/O unit 506 may additionally include a transceiver (not shown) for transmitting an emergency message to a PSAP or remote location and for receiving and sending communications as commonly performed by a wireless communications device 501.

A memory 508 may also be located within the wireless communications device 501 for storing data being processed by the processor 502, as well as user data (not shown) for use in generating a preformatted emergency text message 509. The memory 508 may be RAM, FLASH, or any other memory configured to operate in the wireless communication device 501. In addition to data being processed and the user data, the memory 508 may also store menu information 510 used in displaying menus for guiding a user of the wireless communications device 501 through creation of an emergency text message. Templates 511 that define structure of text messages that are used to report different types of emergencies may also be stored in the memory 508. Depending on selections made by the user using the menus 510, a particular one of the templates 511 may be selected for use in generating an emergency text message. Having different emergency text message templates 511 allows different information to be included or not included depending on the particular type of emergency selected by the user via the menus 510. For example, a fire emergency away from a user's home may not include the user's home address as would a medical emergency occurring at the user's home.

A display 512 for viewing data from the wireless communications device 501 may also be provided. The display 512 may also allow for a user to view an emergency text message that has been generated, edit the message, read replies, and perform many other functions of a display 512.

A GPS device 514 may also be provided within the wireless communications device 501. The GPS device 514 may be an electronic component or some other hardware, either integrated into the wireless communications device or in communication with the wireless communications device 501, which provides GPS enablement to the wireless communications device 501. GPS enablement allows for the wireless communications device 501 to be able to generate current GPS coordinates, which may be used within the emergency text message.

Figure 6:
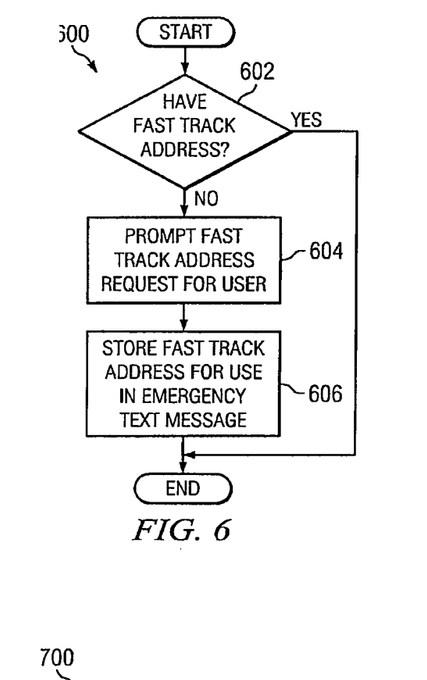
FIG. 6 is a flowchart of one embodiment for inputting a fast track address according to principles of the present invention.

FIG. 6 is a flow chart which is one embodiment of a method 600 for inputting a fast track address according to the principles of the present invention, where a fast track address may be considered the permanent address associated with a wireless communications device that enables a user to be quickly tracked by emergency personnel, as described previously. At step 602, a determination is made as to whether a fast track address has been stored. If a fast track address has been stored, the process ends. If there is no fast track address stored, in step 604, a user is prompted to enter a fast track address using the keypad or any other available input means on the wireless communications device. The fast track address entered may be any address that the user would like to associate with the wireless communications device. In step 606, the entered fast track address for use in the emergency text message may be stored. Upon initiating the communication of an emergency text message, there will be, at a minimum, a fast track address available for communication to the PSAP. Ideally, current location information would also be communicated. However, current location information may not always be available. The described process may occur at any time and is not limited to an initial setup. For example, a user wishing to update a fast track address may also have that option.

Figure 7:
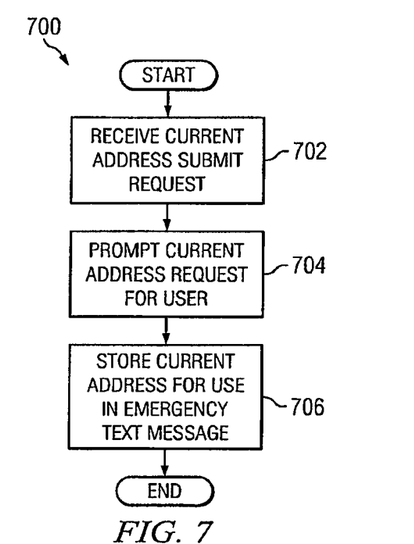
FIG. 7 is a flowchart of one embodiment of a method for inputting a current address location according to principles of the present invention.

FIG. 7 is a flow chart which is one embodiment of a method 700 for inputting a current address location according to principles of the present invention. At step 702, a wireless communications device may receive a request to submit a current address representing where the user is currently located. The request may be generated in response to an input (e.g., menu selection) by the user or the request may be automatically generated by the wireless communications device in the event that the wireless communications device recognizes a change in current location. In step 704, a user is prompted to enter the current address location. The current address location may be a street address, a landmark address, or any other similar address where emergency services may be able to locate the user. In step 706, a current address location for use in emergency text messages may be stored by the wireless communications device. As described previously, if a current address location is not entered by the user, this field may remain blank, thereby potentially reducing the usefulness of the emergency text message for users at the PSAP. However, having the current address location blanked after it is determined that the wireless communications device has moved removes the likelihood that incorrect location information would be stored or otherwise communicated to emergency services.

Figure 8:
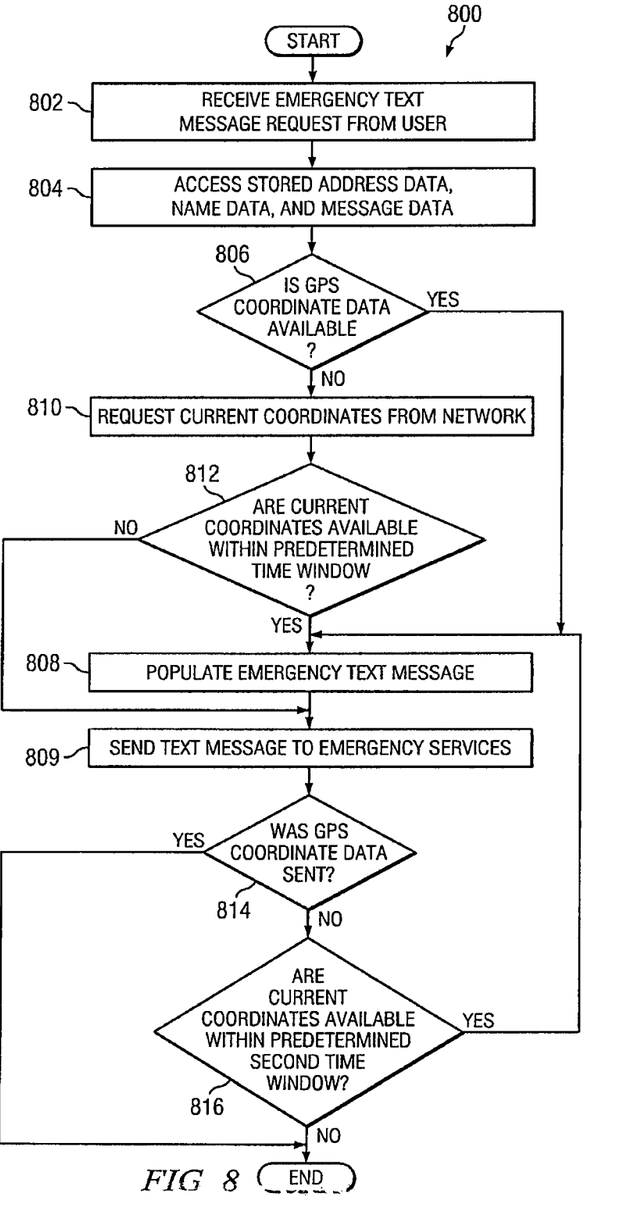
FIG. 8 is a flowchart of one embodiment of a method for communicating an emergency text message to a PSAP according to principles of the present invention.

FIG. 8 is one embodiment of a flow chart 800 for communicating an emergency text message to a PSAP according to principles of the present invention. In step 802, a wireless communications device receives an emergency text message request from a user. The emergency text message request may be initiated by a hard-button, a soft-button, or any other number of methods for initiating the request. In step 804, the wireless communications device may access the stored address data, name data, and message data that is available for populating an emergency text message. The stored data may be located within a wireless communications device itself, but may also be located remotely. Storing the data locally, however, insures that whether or not a communications link is presently available to a remote location including the data, the information will be available.

In step 806, a determination is made as to whether GPS coordinate data is available. If the wireless communications device is GPS enabled and the GPS coordinates are available, then at step 808, an emergency text message is populated with the GPS coordinates. The emergency text message is also populated with the stored information. In step 809, the emergency text message is sent to emergency services, such as a PSAP via a network router configured to identify and route the emergency message to a PSAP local to the user.

If the GPS coordinate data was not available in step 806, in step 810 a request may be made for coordinates that may be available from the network. Triangulation or another commonly known method may be used by the network to determine GPS coordinate data. In step 812, a determination is made as to whether the current GPS coordinates are available within a predetermined time window. The predetermined time window may be any time from a fraction of a second to multiple seconds and should provide sufficient time for coordinates to be made available from the network. If the current GPS coordinates are available within the predetermined time window from step 812, the emergency text message may be populated and then sent to emergency services complete with GPS coordinate data as described previously in steps 808 and 809. If the current GPS coordinates were not available within the predetermined time window, the emergency text message may be sent without GPS coordinate data in step 809. In step 814, a determination is made as to whether the GPS coordinate data was sent. If the GPS coordinate data was sent, the process ends. If the current GPS coordinate data was not sent, a second time window may be granted. In step 816, it may be determined whether GPS coordinates were available within the second time window. If the GPS coordinates data were available within the predetermined second time window, the emergency text message may be populated with the current GPS coordinates and sent to emergency services as described in steps 808 and 809. If the GPS coordinates were not available within the second time window, the process ends.

Figure 9:
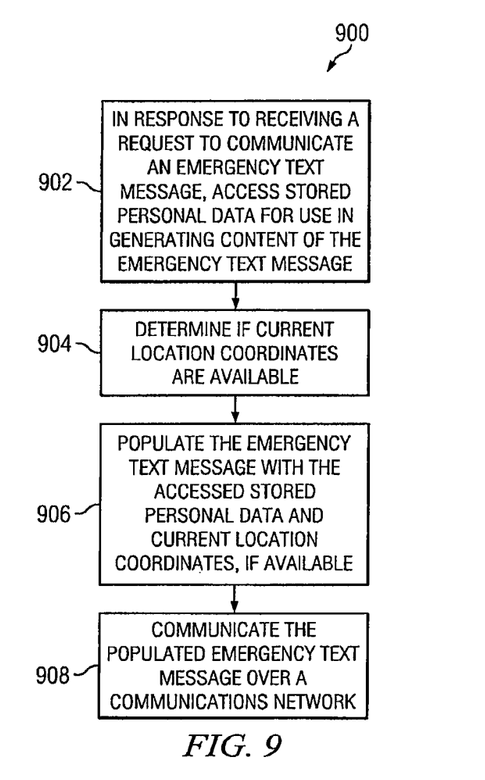
FIG. 9 is a flowchart of one embodiment of a method for communicating an emergency text message to a PSAP according to principles of the present invention.

FIG. 9 is a flowchart 900 of one embodiment for communicating an emergency text message to a PSAP according to principles of the present invention. In step 902, in response to receiving a request to communicate an emergency text message, stored personal data may be accessed for use in generating content of the emergency text message. Stored personal data may include names, addresses, phone numbers, and any other relevant information. In step 904, a determination is made as to whether current location coordinates are available. Current location coordinates may be provided by a GPS enabled wireless communications device or any available network in which the wireless communications device is in communication. The emergency text message may be populated in step 906 with the accessed stored personal data and current location coordinates, if available. In step 908, the populated emergency text message may be communicated over a communications network.

Figure 10A:
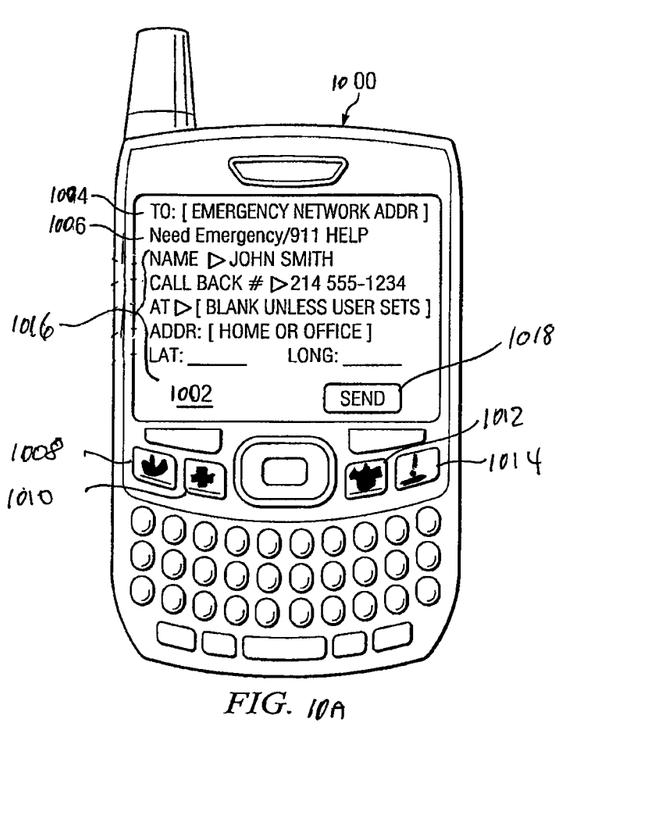
FIG. 10A is an illustration of one embodiment of a wireless communications device configured to initiate the communication of an emergency text message depending on a preset button being selected.

FIG. 10A is an illustration of one embodiment of a wireless communications device 1000 configured to communicate an emergency message. The wireless communications device 1000 may include a display screen 1002 for communicating visual data, such as text, to a user. In this embodiment, the display screen 1002 depicts a number of fields used in populating a preformatted emergency text message. In alternative embodiments, the emergency message may be a pre-recorded voice message, email, or any other type of emergency message not limited to text. A recipient field 1004 may include a generic emergency message router address, such as Internet domain address "911.911", as described previously in FIG. 1. By default, the recipient field 1004 may automatically be populated with the generic emergency message router address. In a case where separate addresses exist for different emergency services, depending upon the types of emergency assistance that ("e.g., police, fire, medical) may be requested, the recipient field 1004 may be populated by different default addresses. For example, particularly in a community without 911 service, a fire department may have a separate address from the police department. In the event a fire emergency is being reported, an address for the fire department could be entered into the recipient field 1004. The addresses are to be centralized addresses associated with server(s) that determine a local PSAP relative to the user.

A message text field 1006 may also be pre-populated with a default message, such as, "need emergency/911 help." In an alternative embodiment, the message text field 1006 may be entered manually and edited by the user. Alternatively, the message text field 1006 may be selected from a list of pre-defined emergency messages or may be selected based upon activating an emergency preset button associated with an emergency type (e.g., "Fire", "Medical Condition").

Several emergency message buttons 1008-1014 are depicted in FIG. 10A. In one embodiment, there may be four separate hard-buttons, each representing a separate emergency category. In other embodiments, any number of emergency message buttons may be provided. Additionally, the emergency message buttons may be soft-buttons as described below in FIG. 10B. A fire emergency message button 1008 may be provided for reporting a fire. A user may be able to simply press the fire emergency message button, and relevant information for fire personnel may be sent to the appropriate address or geographic coordinates.

Similarly, a medical emergency button 1010 may be provided for reporting a medical emergency. One advantage of being able to select a particular emergency is to be able to target the most appropriate address with the most appropriate details relevant to the emergency category. Accordingly, in one embodiment, a request for medical help may be accompanied by additional information associated with a user, such as a medical history profile, allergy information, or any number of other related details. The additional information may be stored on the wireless communications device and accessed in response to selection of the medical emergency button 1010.

A third type of emergency message button may be a police emergency button 1012. If an emergency would preferably be handled by law enforcement, the police emergency button 1012 may be activated. In a situation where none of the emergency message buttons would be singularly applicable (e.g., an accident involving injuries and a fire), a general emergency message button 1014 may be provided.

A message body 1016 that includes additional information for sending in the emergency text message may also be provided. The message body 1016 may include information, such as the user's name, callback number, address location, and coordinates. In addition to generic information, information specific to a particular emergency type may also be provided, as previously described. When the user is ready to communicate the emergency text message, a send button 1018 may be selected to initiate the communication of the message. In other embodiments, a send button may not be necessary and simply selecting the emergency preset button will automatically send the message without further input from the user.

Figure 10B:
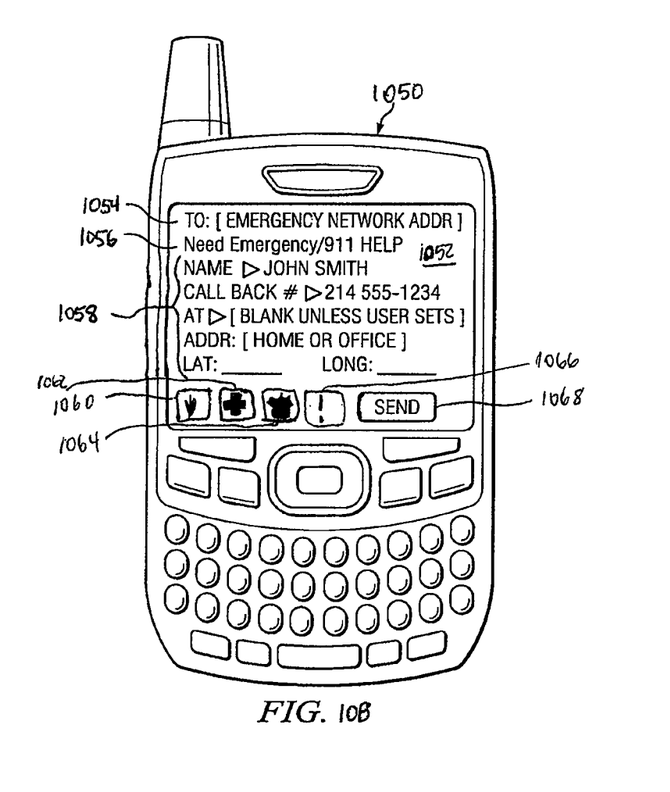
FIG. 10B is an illustration of one embodiment of a wireless communications device configured to initiate the communication of an emergency text message based on a preset soft-button being selected.

FIG. 10B is an illustration of one embodiment of a wireless communications device 1050 configured to initiate the communication of an emergency text message based on a preset soft-button being selected. In one embodiment, the wireless communications device 1050 of FIG. 10B may be essentially the same as the device described in FIG. 10A. However, rather than hard-buttons that activate the communication of an emergency text message, the emergency text message may be activated by the use of soft-buttons. A soft-button may be an icon or other similar depiction provided on a display screen 1052, which may be selected by touch or some other method, for use in activating the communication of a particular type of emergency text message. Although described as being hard-buttons or soft-buttons, it should be understood that any number of hardware (e.g., scroll wheel) and/or software (e.g., menu selections) configurations for providing the same or similar functionality may be provided and be considered equivalent.

A recipient field 1054 may include a generic emergency message router address, such as "911.911", as described previously in FIGS. 1 and 10A. By default, the recipient field 1054 may automatically be populated with the generic emergency message router address. As also described in FIG. 10A, in a case where separate addresses exist for different emergency services, depending upon the category of emergency assistance that is being requested, the recipient field 1054 may be populated by different default addresses.

A message text field 1056 may also be pre-populated with a default message, such as, "need emergency/911 help." In an alternative embodiment, the message text field 1056 may be entered manually and edited by the user. Alternatively, the message text field 1056 may be selected from a list of pre-defined emergency messages or may be selected based upon activating an emergency message button associated with an emergency category. A message body 1058 including additional information for sending in the emergency text message may also be provided. The information in the message body 1058 may vary depending upon the category of the emergency text message.

In one embodiment, the soft-buttons 1062-1066 may all have the same functionality as described as the corresponding hard-buttons in FIG. 10A. The main difference between the wireless communications device of FIGS. 10A and 10B involves the manner in which the emergency message buttons are presented to the user. Rather than being a physical button or key located on the phone, the soft-buttons may be displayed on the display screen 1052 for user selection. One advantage of soft-buttons over hard-buttons may be that the soft-buttons may be easily changed to represent various emergencies. If a user wants to set particular types of emergencies that may be common occurrences for them, the user may alter which buttons are displayed. Upon completion of the emergency text message, a send button 1068 may be selected to initiate the communication of the emergency text message. In some embodiments the send button 1068 may not be used. For example, if the emergency message soft-button is programmed to automatically send the message upon activation, without any other user input, pressing the send button 1068, would not be necessary.

Figure 11:
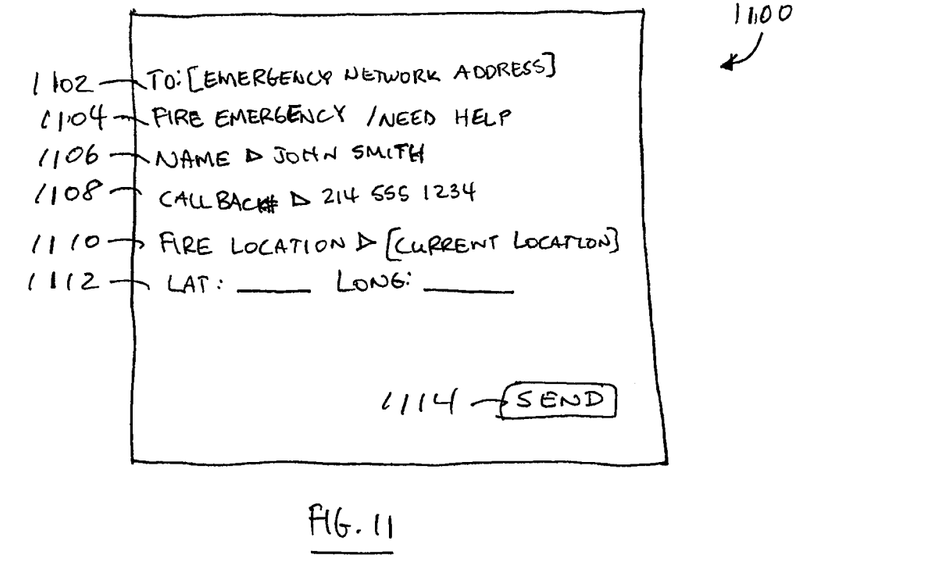
FIG. 11 is a screen shot of one embodiment of a display screen on a wireless communications device.

FIG. 11 is a screen shot of one embodiment of a display screen 1100 on a wireless communications device. This embodiment represents an emergency text message that may be generated upon the activation of an emergency message button for reporting a fire emergency. A recipient field 1102 may include a generic emergency message router address, such as "911.911", as described previously. By default, the recipient field 1102 may automatically be populated with the generic emergency message router address. As also described previously, in a case where separate addresses exist for different emergency services, depending upon the type of emergency assistance that is being requested, the recipient field 1102 may be populated by the same or different default addresses.

A message text field 1104 may be automatically populated based on emergency messages that are applicable to the emergency message button selected. For example, the fire emergency message button, which was selected for this figure, may insert "Fire Emergency/Need Help" in the message text field 1104.

Other fields may also be populated automatically based upon the category of the emergency message. For example, a name field 1106 may also be pre-populated with a name associated with the emergency text message, such as, "John Smith." In an alternative embodiment, the name field 1106 may be entered manually and edited by the user. For automatic generation and communication of the emergency text message, however, a default name may ordinarily be used without having the option to edit the name once the preset button has been activated. In a situation where emergency services may need more information, a call back number field 1108 may be populated with a telephone number that may be used for obtaining additional information.

A fire location field 1110 may be used to provide detailed information regarding the location of the fire. The current location based on a stored location, GPS coordinates, or network derived location information may be used. In FIG. 11, both a stored location within the fire location field 1110 and GPS Coordinate fields 1112 may be provided. In one embodiment, a menu or series of menus may be used to fill in relevant details for the emergency type. For example, in the case of a fire emergency, after activation another screen may populate asking for input as to whether the fire is located at your home address, work address or some other address. If the other address selection is made, another screen may display allowing a user to input more specific details regarding the address. It is important to note that the pre-defined buttons may automatically send messages or may allow the user the opportunity to include additional information either manually or through the use of a menu or other automated device. Although it is not depicted in FIG. 11, any additional information that may be useful for reporting a fire emergency may also be included within the emergency text message.

Figure 12:
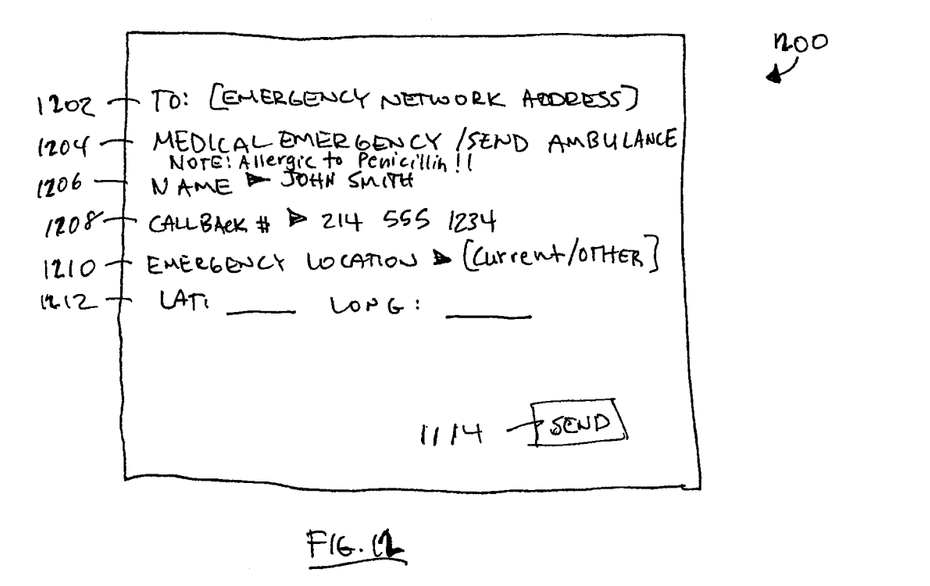
FIG. 12 is a screen shot of one embodiment of a display screen on a wireless communications device.

FIG. 12 is a screen shot of one embodiment of a display screen 1200 on a wireless communications device. This embodiment represents an emergency text message that may be generated upon the activation of an emergency message button for reporting a medical emergency. A recipient field 1202 may include a generic emergency message router address, such as "911.911", as described previously. By default, the recipient field 1202 may be automatically populated with the generic emergency message router address. As also described previously, in a case where separate addresses exist for different emergency services, depending upon the type of emergency assistance that is being requested, the recipient field 1202 may be populated by the same or different default addresses.

A message text field 1204 may be automatically populated based on emergency messages that are applicable to the emergency message button selected. For example, the medical emergency message button, which was selected for this figure, may insert "Medical Emergency/Need Help" in the message text field 1204. In addition to a generalized "help needed" message, a user's medical history, allergy information, medication listing, or any other relevant detail that may be stored or available to the wireless communications device may additionally be provided in this or another field.

Other fields may also be populated automatically based upon the category of the emergency message. For example, a name field 1206 may also be pre-populated with a name associated with the emergency text message, such as, "John Smith." In an alternative embodiment, the name field 1206 may be entered manually and edited by the user. For automatic generation and communication of the emergency text message, however, a default name may ordinarily be used without having the option to edit the name once the preset button has been activated. In a situation where emergency services may need more information, a call back number field 1208 may be populated with a telephone number that may be used for obtaining additional information.

An emergency location field 1210 may be used to provide detailed information regarding the location of the medical emergency. The current location based on a stored location, GPS coordinates, or network derived location information may be used. In FIG. 12, both a stored location within the emergency location field 1210 and GPS Coordinate fields 1212 may be provided. Although it is not depicted in FIG. 12, any additional information that may be useful for reporting a medical emergency not previously included may also be included within the emergency text message.

Figure 13:
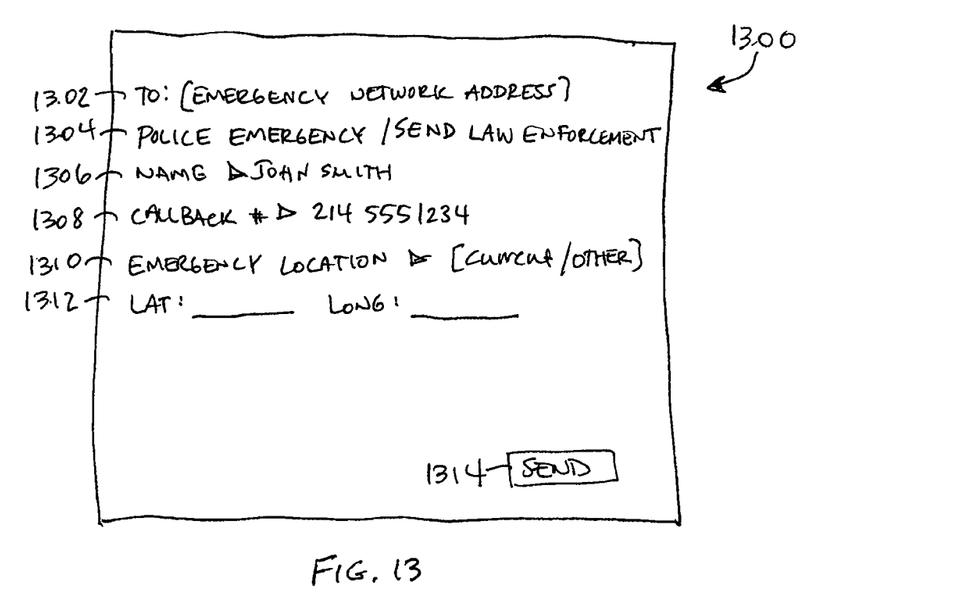
FIG. 13 is a screen shot of one embodiment of a display screen on a wireless communications device.

FIG. 13 is a screen shot of one embodiment of a display screen 1300 on a wireless communications device. This embodiment represents an emergency text message that may be generated upon the activation of an emergency message button for reporting a police emergency. A recipient field 1302 may include a generic emergency message router address, such as "911.911", as described previously. By default, the recipient field 1302 may be automatically populated with the generic emergency message router address. As also described previously, in a case where separate addresses exist for different emergency services, depending upon the category of emergency assistance that is being requested, the recipient field 1302 may be populated by different default addresses.

A message text field 1304 may be automatically populated based on emergency messages that are applicable to the emergency message button selected. For example, the medical emergency preset button, which was selected for this figure, may insert "Police Emergency/Need Help" in the message text field 1304. In addition to a generalized "help needed" message, additional information regarding the type of police emergency or other specific details may additionally be provided in this or another field. In one embodiment, selectable emergency options may be presented to the user for selection to provide more specific information. For example, "assault," "domestic violence," "kidnapping," "theft," "auto accident," "other" and so forth, may be presented to the user in a menu-style or otherwise for selection by the user to include in the emergency message.

Other fields may also be populated automatically based upon the category of the emergency message. For example, a name field 1306 may also be pre-populated with a name associated with the emergency text message, such as, "John Smith." In an alternative embodiment, the name field 1306 may be entered manually and edited by the user. For automatic generation and communication of the emergency text message, however, a default name may ordinarily be used without having the option to edit the name once the preset button has been activated. In a situation where emergency services may need more information, a call back number field 1308 may be populated with a telephone number that may be used for obtaining additional information.

An emergency location field 1310 may be used to provide detailed information regarding the location of the medical emergency. The current location based on a stored location, GPS coordinates, or network derived location information may be used. It is to be understood that the emergency location may not always be the current location. Therefore, the emergency location field may sometimes need to be edited to reflect the location of the emergency. In FIG. 13, both a stored location within the emergency location field 1310 and GPS coordinate fields 1312 may be provided. Although it is not depicted in FIG. 13, any additional information that may be useful for reporting a police emergency, not previously included, may also be included within the emergency text message.

Figure 14:
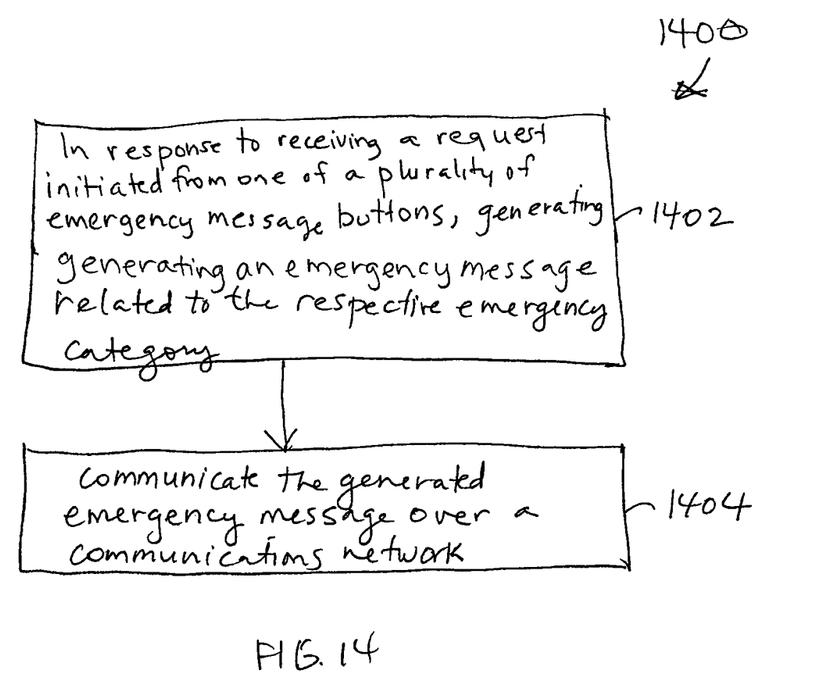
FIG. 14 is a flowchart of one embodiment of method for generating an emergency message according to principles of the present invention.

FIG. 14 is a flowchart of one embodiment of method for generating an emergency message according to principles of the present invention. In step 1402, in response to receiving a request initiated from one of a plurality of emergency message buttons configured to initiate communication of respective emergency messages related to different emergency categories, an emergency message related to the respective emergency category may be generated. As mentioned previously, the emergency message may be in the form of a short message service (SMS) or text message, an e-mail, and audio message, such as a pre-recorded voice message, or any other type of message, verbal or written. Various emergency categories may include fire, police, ambulance, general, as well as any number of pre-defined or user-defined categories.

In step 1404, the generated emergency message may be communicated over a communications network. Using the most appropriate method, based upon the emergency message type, the emergency message may be communicated to the appropriate network address. In one embodiment, the network address may be a centralized server with the ability to determine the particular type of emergency message being communicated. Depending upon the type of message (e.g., text, voice, etc), as well as the location of the emergency, the emergency message may be routed to a local PSAP with the ability to receive the type of emergency message (e.g., text) being sent.

Although the principles of the present have primarily been described with regard to wireless communications devices, it should be understood that wired communications devices, including wired/wireless computers, may be adapted to include emergency messaging, as described herein. One or more buttons or other initiation devices may be provided on the wired communications devices to generate and communicate an emergency data message to a network location for routing to a PSAP local to the user. In adapting the wired communications devices, software may be included in the devices to generate and communicate an emergency data message (e.g., text message or email) using a communications protocol that is capable of being communicated over the communications network (e.g., public switched telephone network, cable network, Internet), as understood in the art. Information specific to the user, location of the user, or otherwise may be included in the emergency data message. For example, name, address, number of people in residence, photograph, medical conditions, or any other information may be pre-established for retrieval and inclusion in the emergency data message, thereby providing information to an operator at a PSAP to provide emergency personnel, such as police, firemen, or medical personnel.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed as new and desired to be protected by Letters Patent of the United States is:

1. A method for generating an emergency message, the method comprising:
   determining a location of a wireless device in response to receiving a request initiated from one of a plurality of emergency message buttons of the wireless device, the plurality of emergency buttons are configured to initiate communication of respective emergency messages related to different emergency categories;
   generating an emergency message related to the respective emergency category in response to the request, wherein the plurality of emergency message buttons are soft-buttons selected by a user for utilization by the wireless device, and wherein the generated emergency message is populated with additional information associated with (1) the emergency category of the generated emergency message, (2) the location of the wireless device, and (3) personal information of a user of the wireless device;
   communicating the generated emergency message from the wireless device to an emergency message router over a wireless communications network in response to the emergency message being generated;
   determining at the emergency message router, based upon knowledge of the capabilities of selected PSAPs and based upon the determined location of the wireless device, a PSAP which is closest to the wireless device and further having the capacity to receive the generated emergency message populated with (1) the emergency category of the generated emergency message, (2) the location of the wireless device, and (3) personal information of a user of the wireless device; and
   routing the generated emergency message to the determined PSAP.

2. The method according to claim 1, wherein the plurality of emergency message buttons include at least two of fire, police, medical, and general.

3. The method according to claim 2, wherein:
   in response to receiving a selection of a medical emergency button, retrieving medical record information of a user; and
   wherein generating the emergency message includes adding the medical record information in the emergency message.

4. The method according to claim 1, wherein generating the emergency message includes:
   retrieving the personal information from the wireless device for populating the emergency message, wherein the personal information was previously entered by the user.

5. The method according to claim 1, wherein receiving a request from one of a plurality of emergency message buttons includes receiving a request from the emergency message button for generating a fire emergency text message.

6. The method according to claim 1, further comprising:
   populating a recipient field of the emergency message according to the emergency category associated with the one of a plurality of emergency message buttons; and
   accessing the personal information relevant to the respective emergency category to be included in the additional information in generating the emergency message related to the respective emergency category.

7. The method according to claim 1, wherein accessing the personal information includes accessing a name and home address entered by the user, if available.

8. The method according to claim 6, further comprising accessing a stored emergency network address associated with the emergency category.

9. The method according to claim 8, wherein communicating the emergency message includes communicating the emergency message to an appropriate emergency network address, and wherein the appropriate emergency network address is different for each of the plurality of emergency message buttons.

10. The method according to claim 1, wherein the additional content is pre-entered or selected by the user for use during an emergency.

11. A wireless communications device, comprising:
    a memory storing personal data of a user;
    an input/output (I/O) unit configured to communicate with a communications network;
    a user interface;
    a plurality of emergency message buttons, wherein the plurality of emergency message buttons are soft-buttons selected by a user for display to the wireless communications devices; and
    a processing unit in communication with the memory, I/O unit, user interface and emergency message buttons, and configured to:
       determine a location of the wireless communications device in response to receiving a request initiated from one of the plurality of emergency message buttons configured to initiate communication of respective emergency messages related to different emergency categories;
       generate an emergency message related to the respective emergency category in response to receiving the request, wherein additional information associated with (1) the emergency category of the emergency message, (2) the location of the wireless communications device, and (3) personal information of a user of the wireless communications device is included in the emergency message; and
       communicate the generated emergency message to an emergency message router over a communications network via the I/O unit in response to the emergency message being generated;
       determine at the emergency message router, based upon knowledge of the capabilities of selected PSAPs and based upon the determined location of the wireless device, a PSAP which is closest to the wireless device and further having the capacity to receive the generated emergency message populated with (1) the emergency category of the generated emergency message, (2) the location of the wireless device, and (3) personal information of a user of the wireless device; and
       route the generated emergency message to the determined PSAP.

12. The wireless communications device according to claim 11, wherein the plurality of emergency message buttons include at least two of fire, police, medical, and general.

13. The wireless communications device according to claim 12, wherein the processing unit is further configured to:
in response to receiving a selection of a medical emergency, retrieve medical record information from the memory of the wireless communications device; and
include the medical record information in the emergency message in generating the emergency message.

14. The wireless communications device according to claim 11, wherein the processing unit, in receiving a request from one of a plurality of emergency message buttons, is further configured to receive a request from the emergency message button for generating a fire emergency text message.

15. The wireless communications device according to claim 14, further configured to:
populate a recipient field of the generated emergency message according to the emergency category associated with the one of a plurality of emergency message buttons; and
access the personal information relevant to the respective emergency category to be included in the additional information in generating the emergency message related to the respective emergency category.

16. The wireless communications device according to claim 15, further configured to access a name and home address as the personal information, if available.

17. The wireless communications device according to claim 11, wherein the wireless communications device is further configured to access a stored emergency network address for the emergency category associated with the one of the plurality of emergency message buttons.

18. The wireless communications device according to claim 17, wherein the processor is further configured to communicate the emergency message to an appropriate emergency network address, wherein the appropriate emergency network address is different for each of the selected emergency message buttons.

19. The wireless communications device according to claim 11, wherein content of the emergency message is pre-entered by the user.

* * * * *